Sept. 25, 1923.
M. RAHR, JR
1,469,109
AUTOMOBILE ACCESSORY
Filed July 15, 1920    2 Sheets-Sheet 1
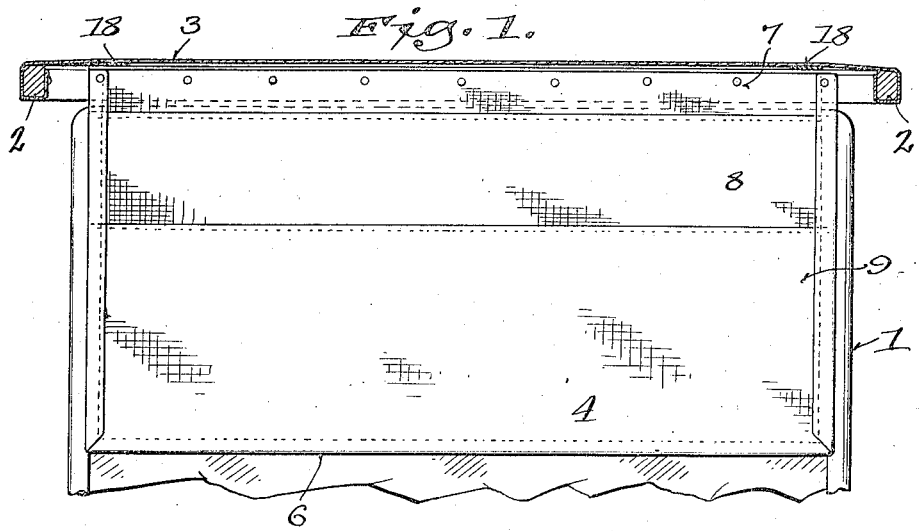
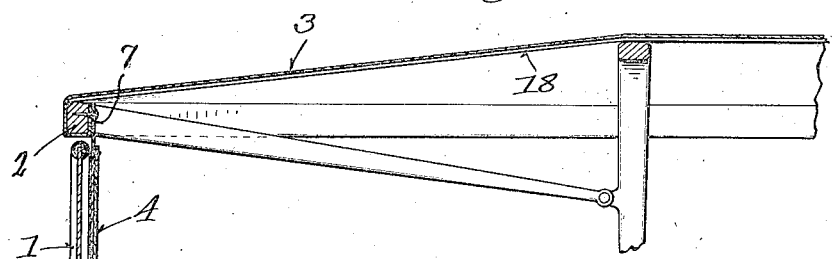
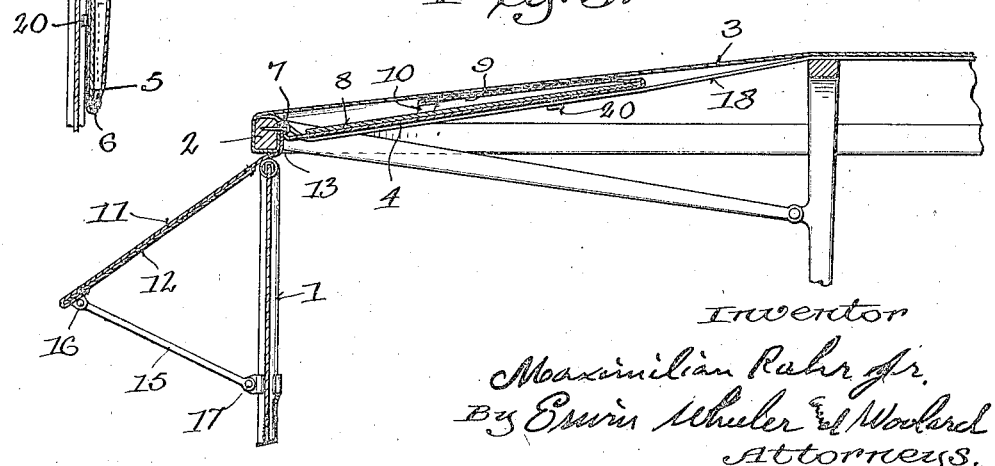
Inventor
Maximilian Rahr Jr.
By Erwin Wheeler & Woolard
Attorneys.

Sept. 25, 1923.                     M. RAHR, JR                         1,469,109
                                AUTOMOBILE ACCESSORY
                              Filed July 15, 1920          2 Sheets-Sheet 2
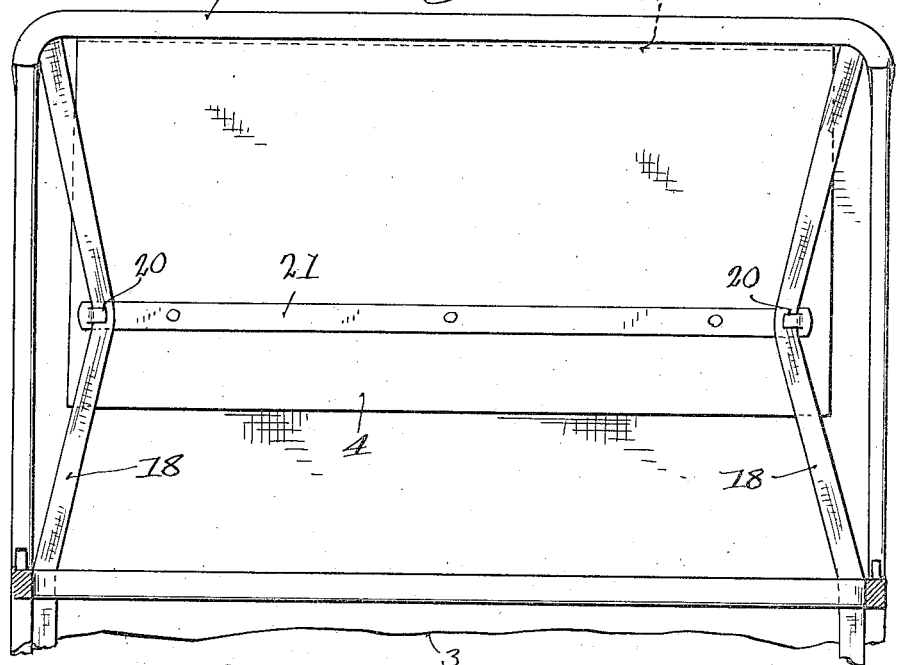
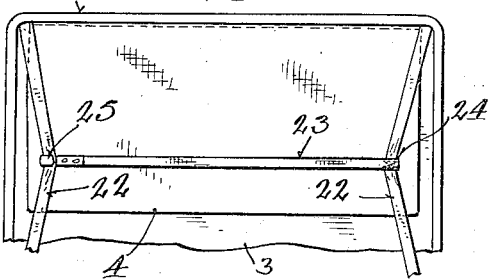
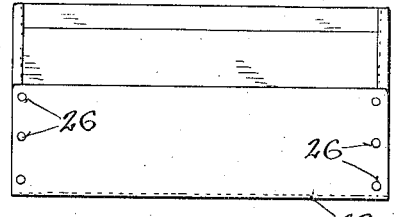
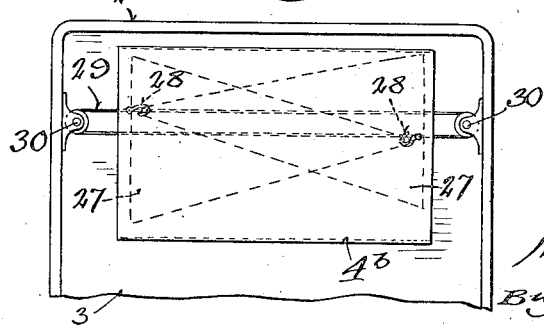
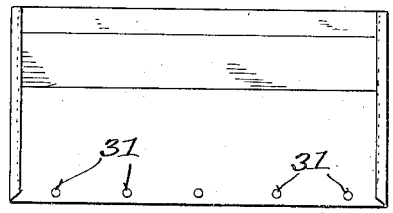

Patented Sept. 25, 1923.

1,469,109

UNITED STATES PATENT OFFICE.

MAXIMILIAN RAHR, JR., OF MANITOWOC, WISCONSIN.

AUTOMOBILE ACCESSORY.

Application filed July 15, 1920. Serial No. 396,346.

*To all whom it may concern:*

Be it known that I, MAXIMILIAN RAHR, Jr., a citizen of the United States, residing at Manitowoc, county of Manitowoc, Wisconsin, have invented new and useful Improvements in Automobile Accessories, of which the following is a specification.

This invention relates to automobile accessories and is particularly directed to combined automobile curtain storage-slings and rain vision windshields.

Objects of this invention are to provide storage slings in which automobile curtains may be readily and easily stored giving thereby the maximum accessibility; to provide automobile storage slings which may be positioned adjacent the top or canopy of the automobile after the curtains have been stored therein, thereby utilizing the space usually wasted in automobile tops.

Other objects of this invention are to provide a combined storage sling and clear vision windshield so arranged that the clear vision windshield may be extended independently of the sling to give either a rain protecting shield for the windshield or else a sunshade to prevent objectionable glare upon the windshield; and also to provide this clear vision windshield or sunshade in such a relation to the storage sling that said shield may be housed adjacent the storage slings in the canopy top and thereby give additional support to the storage slings.

In the drawings:

Fig. 1 is a view partly in section of an automobile looking from the inside towards the windshield and showing the storage sling in extended position ready to receive the automobile curtains or articles to be stored.

Fig. 2 is a longitudinal sectional view of the device in the position shown in Fig. 1.

Fig. 3 is a similar view showing the storage sling housed adjacent the canopy top and the clear vision windshield in operative position.

Fig. 4 is a fragmentary view looking towards the top of the automobile and showing the storage sling housed adjacent the canopy top.

Fig. 5 is a similar view of a modified form of storage sling suspension.

Fig. 6 is a view of a modified form of storage sling.

Fig. 7 is a further modified form of storage sling showing the quarter side curtains housed therein and arranged to be simultaneously withdrawn.

Fig. 8 is a further modified form of storage sling.

Although the clear vision windshield has been shown in combination with a storage sling, it is to be understood that either may be used independently of the other if so desired; they are, however, shown together for the reason that there is a combination or cooperation between the parts, as the support of the storage sling is materially assisted by the windshield when both devices are housed in the canopy top.

In Figs. 1, 2 and 3, the windshield frame 1 is shown as extending upwardly closely adjacent the front bow 2 of the canopy top 3. It is, however, to be understood that the invention is equally applicable to automobiles in which the canopy top bow 2 extends outwardly beyond the windshield frame 1. In the latter case, an extension is provided for the storage slings 4 so that the operation and the construction of the device remain substantially the same as that illustrated. The storage sling 4 comprises a stiffener 5 which is covered with fabric 6 on both sides and which is hingedly joined to the front bow 2 by means of an extension 7 of the fabric 6, this extension 7 being permanently secured to the front bow and furnishing the necessary flexibility to act as a hinge without additional attachments. The fabric 6 may continue in an unbroken sheet over the stiffener 5 or else an additional piece of fabric 8 may cover the inner or upper side of the stiffener 5 and the fabric 6 may be continued as shown at 9 to form a pocket 10 closed on the bottom and sides and open at the top in the position shown in Fig. 2. The stiffener 5 may be either metallic or non-metallic, and of solid or skeleton frame structure.

Fig. 3 shows the clear vision rain shield 11 in extended position and the storage sling 4 housed adjacent the canopy top. The clear vision rain shield comprises a stiffening member 12 which may be covered on one or both sides with a waterproof fabric as shown. An extension 13 of this fabric is secured beneath the extension 7 of the storage sling to the front bow 2 of the automobile and allows the free hinging motion of the shield 11. When the shield 11 is extended as shown in Fig. 3 a brace 15 is provided which is pivotally attached at 16 to the lower forward edge of the shield 11 and removably attached at 17 to the windshield frame. When this shield 11 is not in use, the front bow and canopy may be lifted to allow the passage of the shield 11 inwardly after detaching the brace 15. The extension 13 allows the shield to freely hinge or pivot adjacent the front bow 2 so that this shield may be moved upwardly against the bottom portion of the storage sling 4 and supported in such position.

Fig. 2 shows the storage sling independently of the shield 11, while Fig. 3 shows the storage sling and shield in combination upon the same automobile.

Fig. 4, which is a view of the under side of the canopy top of an automobile, shows the storage sling supported adjacent the canopy top. A pair of straps 18 are attached at their forward ends to the front bow 2 and at their rear end to the next bow 19 or to the side bow of the automobile. These straps 18 are stretched between these two bows and are adapted to be slightly spread to permit the passage of the storage sling 4 therebetween. After the storage sling 4 has been positioned above these straps 18, they are drawn inwardly towards each other adjacent their center portions and are secured beneath hooks 20. These hooks 20 are attached to the storage sling 4 and may be attached to a connecting strap or member 21 so that the outward pull or strain imposed upon the hooks 20 may be transmitted directly from one hook to the other hook, and avoid the tendency to tear such hooks from the storage sling 4. It will be seen that by providing this additional means for tensioning the straps 18 after the storage sling 4 is in position, these straps may be made very taut so as to firmly hold the storage sling 4 in stored position and avoid sagging.

If the shield 11 is also to be housed with the storage sling 4, hooks may be provided thereon in a manner similar to that shown in connection with the storage sling, or else the edges of the shield 11 may be notched to allow the passage therethrough of the hooks 20 of the storage sling 4 in this form of the invention.

Fig. 5 shows a different method of suspension. In this form of the invention straps 22 are provided in a manner similar to the straps 18 of the structure shown in Fig. 4. However, the tensioning of these straps is secured by means of a cross strap 23 which is secured at 24 to one of the straps 22 and is provided with a hook 25 at its other end adapted to detachably engage the other strap 22 in a manner readily understood. In this construction, the shield 11, if used, may readily be stored beneath the storage sling 4 and adequately held in place by the straps 22 and 23.

Fig. 6 shows a further form of the invention in which the storage sling $4^a$ is provided with securing means 26 along the side edges so that the curtains may be inserted from the sides of this storage sling and the pocket may thereafter be closed along the side edges by the snap fasteners or buttons 26. In this form of the invention the upper edge of the pocket may either be open or closed and if closed, insertion of the curtains is made through the sides only. If, however, the pocket is open along its upper edge the entire pocket may be folded downwardly and the curtains arranged in place.

Fig. 7 shows a further form of the invention in which the storage sling $4^b$ is permanently secured in position beneath the canopy top. The quarter curtains, or triangular shaped curtains, 27 are attached by means of eyelets 28 adjacent their apexes to a continuous band or belt 29 which is arranged to pass over pulleys 30 arranged adjacent the side bows or frames of the canopy top. In this form of sling the pocket is permanently open along the side edges only, the forward and rear edges of the pocket being closed. When it is desired to use these curtains, the band 29 is pulled so as to cause the opposite portions thereof to pull the curtains out upon opposite sides of the storage sling. Inasmuch as the apex of the curtain is adapted to be secured adjacent the side bow, it is not necessary to detach the eyelet 28 from engagement with the band 29, altho these eyelets 28 may be arranged to detachably engage suitable hooks secured upon the band 29. After the curtains have been used, they may be drawn back into the pocket by operating the band 29.

Fig. 8 shows a further form of the invention in which the bottom portion of the pocket is detachably closed by means of fasteners 31. In this form, the side edges are closed and the upper edge or forward edge of the pocket may be either closed or open as desired.

I claim:

1. The combination with a vehicle canopy top having bows, of a holder for curtains, said holder comprising a pocket having a substantially unyielding wall, straps secured between said bows and adapted to allow the passage therebetween of said pocket without distorting said unyielding wall, and to retain said pocket in stored position, and means for drawing said straps laterally beneath said holder to maintain the holder in horizontal position.

2. The combination with an automoblie having a canopy top provided with bows and having a wind shield, of a storage curtain sling and a clear vision rain shield hingedly connected adjacent their forward edges to one of the bows of said canopy top, and adapted to be swung either downwardly or upwardly adjacent the canopy top and means for retaining said curtain storage sling and clear vision wind shield in stored position adjacent the canopy top, whereby both said sling and shield may be stored adjacent said canopy top or else said sling alone may be so stored.

3. In combination with a vehicle canopy top having bows, a curtain storage sling having a substantially unyielding side and having a pocket formed thereon, of straps extending between said bows, and means for placing additional tension upon said straps whereby said straps may be caused to approach each other adjacent their center portions and to form an adequate support for said curtain storage sling 4. In combination with an automobile having a canopy top provided with bows, and having a wind shield, of a storage sling having a substantially unyielding side and having a flexible side forming a pocket therewith, of straps extending between said bows and adapted to support said storage sling adjacent the canopy top, and hooks formed upon said storage sling for engagement with said straps.

5. In combination with a vehicle canopy top having bows, a curtain storage sling having a pocket formed therein, straps extending between said bows and adapted to retain said storage sling adjacent the canopy top, and an independent cross strap detachably connecting said first mentioned straps for placing additional tension upon said first mentioned strap.

6. In combination with a vehicle canopy top having bows, a curtain storage sling having a pocket formed therein, straps extending between said bows and adapted to retain said curtain storage sling adjacent the canopy top, and a cross strap permanently secured to one of said first mentioned straps, and detachably secured to the other of said first mentioned straps, whereby said first mentioned straps may be tensioned by said cross strap.

In testimony whereof I affix my signature in the presence of two witnesses.

MAXIMILIAN RAHR, Jr.

Witnesses:
  LEVERETT C. WHEELER,
  O. C. WEBER.